3,006,772
MARGARINE, ANTISPATTERING SUBSTANCE AND METHOD OF MANUFACTURING THE SAME

Gerardus Martinus Maria Houben and Everhardus Wilhelmus Jonker, Gouda, Netherlands, assignors to N.V. Koninklijke Stearine Kaarsenfabrieken "Gouda-Appolo," Gouda, Netherlands, a corporation of the Netherlands
No Drawing. Filed Mar. 4, 1959, Ser. No. 797,028
Claims priority, application Netherlands Mar. 5, 1958
22 Claims. (Cl. 99—123)

This invention relates to the manufacture of an improved margarine and to the margarine thus produced. It also relates to the manufacture of antispattering substances and compositions and to these substances and compositions. Margarine is known to spatter when fried. This is a source of inconvenience for users and many endeavours have been made to find substances which if present in margarine prevent spattering, or in other words which have an antispattering effect.

Of these antispattering additions lecithins or phosphatides in the form of eggyolk or of vegetable phosphatides from oil seeds, are the oldest; recently a synthetic lecithin has appeared. They decrease the tendency to spatter on frying but are far from preventing it; moreover they have an undesirable effect on the taste and keeping qualities if used in proportion sufficient to obtain a worth-while reduction of spattering. Of chemical substances a great variety has been tested and though many substances cause a definite reduction in spattering only very few substances recommended for use as antispatterers suppress spattering to a desirable extent.

Against the use of these few sufficiently effective substances serious objections have been raised in view of the health hazards they present. Accordingly it is quite common for margarines at present in the market to show marked and undesirable spattering on frying.

It is an object of the present invention to provide substances that cause margarines having a content of such a substance to spatter very little or not at all on frying. A further object is to provide processes of manufacturing margarine that spatters little or not at all by imparting a content of the said substances.

Another object is to provide processes of manufacturing certain of the said substances in a simple and practical manner. Finally it is an object of the present invention to provide antispattering compositions that practically or completely suppress spattering even when used in very low proportions.

According to the present invention the process of manufacturing a margarine that on frying spatters not at all or to a highly reduced degree comprises imparting a content of a mixed ester of a polyalcohol with either three hydroxyl-groups, of which one is esterified with a fatty acid of 8–24 carbon atoms and of which another may be esterified with a fatty acid of 1–24 carbon atoms, or four hydroxyl-groups of which one is esterified with a fatty acid of 8–24 carbon atoms and of which one or two may be esterified with a fatty acid of 1–24 carbon atoms, esterified with one or two molecules of a polycarboxylic acid, selected from the group consisting of tricarballylic acid, aconitic acid and acylated or non-acylated hydroxypolycarboxylic acids, of which polycarboxylic acid one carboxyl group at least is not esterified, excluding mixed esters with two acylated hydroxypolycarboxylic acid radicals if the latter radicals contain four or more acyl residues per molecule of mixed esters.

The said mixed ester may be represented by the schematical formula:

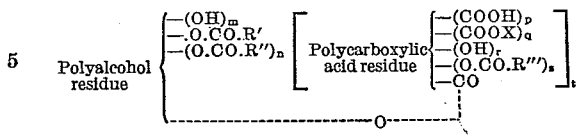

X=one molecule of a polyalcohol less one OH.
R'.CO.=fatty acid residue with 8–24 C-atoms,
R''.CO. and R'''.CO.=fatty acid residue with 1–24 C-atoms, The letters $m, n, p, q, r, s$ and $t$ represent the following integers: $t=1$ to 2; $q=0$ to 1; $s=0$ to 2; $q+r+s=0$ to 3; $t+s\leq 3$; $p=1$ to 2; $r=0$ to 2; $p+q=1$ to 2; $p+r+s=2$ to 3; $n=0$ to 1; $m+n+t=2$ to 3.

According to the above definition and to the schematical formula the said mixed ester may contain either one or two polycarboxylic acid residues per one polyalcohol residue partly esterified with fatty acid.

Preference however is given, according to the invention, to mixed esters which contain one polycarboxylic residue per one polyalcohol residue partly esterified with fatty acid; in other words referring to the above schematical formula, where $t=1$.

Most of the processes of preparing the antispattering mixed esters of the invention, several of which processes are known, do not lead to one ester in a pure form but to a complicated mixture of several individual chemical compounds, varying in the number of polyalcohol residues partly esterified with fatty acid and the number of polycarboxylic acid residues that make up one molecule. For instance, when one mol of monostearin is esterified with one mol of malic acid, the individual mixed ester containing one monostearin residue linked to one carboxyl group of malic acid will be the predominant constituent in the reaction product, but all possible combinations and permutations between the hydroxyl groups of monostearin and the carboxyl groups of malic acid will be formed to a less degree. For the purpose of the invention it is not at all necessary to split up such complex reaction mixtures and to isolate the defined esters. The reaction products can be used as such and the appended claims should be read to cover the use not only of the pure substances defined but also the use of mixtures of which the defined substances are substantial constituents.

According to the invention esterification of a monoester of glycerol, pentaerythritol or sorbitan with a fatty acid, saturated or unsaturated, containing 8–24 carbon atoms, advantageously 8–20 carbon atoms and preferably 12–18 carbon atoms, with a polycarboxylic acid selected from the group consisting of tricarballylic acid, aconitic acid and acylated or non-acylated mono- or dihydroxypolycarboxylic acids is a convenient manner of obtaining active antispattering esters. When using acylated tartaric acid or citric acid the practical thing is to use the anhydride since it is in this form that the acylated acids are obtained and their substantially complete esterification with monoglycerides, diglycerides or mono- or di-fatty acid esters of pentaerythritol or sorbitan can be obtained by simply heating the mixture to 100–150° C. for one or two hours in a known manner.

When using 1 mol of a monoglyceride or of another of the said fatty acid esters per 1 mol of the acylated anhydride the incorporation of 0.12% to 0.24% of the resulting ester in a margarine composition, that without addition of an antispatterer spatters strongly, causes a striking antispattering effect of the said ester to be found.

or stronger still is the effect of the use of 0.12% of the said ester together with 0.04% soyalecithin. For instance, a margarine that without any addition showed a spattering loss of over 10,000 mg., after incorporation of 0.20% of the ester obtained from 1 mol of monostearin (90% pure) and 1 mol of diacetyltartaric acid anhydride showed a spattering loss of 200 mg. whereas after incorporation of 0.12% of the said ester and also 0.04% soyalecithin the spattering loss was nil.

On the same margarine 0.12% of the esters obtained from 1 mol of monostearin (70% pure) and 1 mol of acetylcitric acid anhydride showed a spattering loss of 100 mg. 0.12% of the same ester together with 0.04% soyalecithin (on a different margarine) showed a spattering loss of nil.

A fairly satisfactory spattering loss namely of 90 mg. was also obtained with 0.12% of the stearoylanalogon of the said ester and 0.04% lecithin where the ester was obtained from 1 mol of monostearin and 1 mol of stearoylcitric acid anhydride.

However, when 1 mol of monostearin is esterified with 2 mols of diacetyltartaric acid either during 10 minutes at 160° C. or during 1 hour at 120° C. the antispattering effect of 0.12% of the resulting esters even in combination with 0.04% soyalecithin is quite poor if compared with the esters of the invention, the spattering loss with lecithin amounting to 1800 and 1100 mg. respectively and without lecithin to 2000 mg.

An even more convenient manner of manufacturing mixed esters which have good antispattering effect according to the invention is by heating a mono-ester of a triol or tetrol with a fatty acid, or a mixture of esters containing the said mono-ester, with a hydroxypolycarboxylic acid to a temperature between 110° and 150° C. during 10 hours to about 15 minutes, the time allowed being shorter the higher the temperature.

According to the invention it is of advantage to use about equimolecular proportions of the said mono-ester and of the said hydroxypolycarboxylic acid in order to obtain a maximum antispattering effect for a given weight of the resulting ester mixture. This is apparent from the following table showing spattering losses of a margarine composition of which portions had been provided with a series of different esters. In each portion 0.10% monostearin, 0.04% soyalecithin and 0.12% ester mixture of the invention had been incorporated.

TABLE I

| Ester from— | Reaction | | Proportion of ester, percent | Spattering loss, mg. |
| --- | --- | --- | --- | --- |
| | temp., degrees | time, h. | | |
| 1 mol malic acid and 1 mol monostearin | 130 | 2 | 0.12 | 0 |
| 0.33 mol malic acid and 1 mol monostearin | 130 | 2 | 0.12 | 190 |
| 3 mol malic acid and 1 mol monostearin | 130 | 2 | 0.12 | 35 |
| 1 mol citric acid and 1 mol monostearin | 130 | 2 | 0.12 | 0 |
| 0.4 mol citric acid and 1 mol monostearin | 130 | 2 | 0.12 | 25 |
| 3 mol citric acid and 1 mol monostearin | 130 | 2 | 0.12 | 25 |

When using 3 mols acid per mol monostearin part of the excess acid remains undissolved after the reaction.

Using a maximum of 1 mol hydroxypolycarboxylic acid per mol mono-ester has the advantage that the acid, which is usually the most expensive ingredient, is to a high extent taken advantage of whereas any excess of the mono-ester is useful in margarine as an antiweeping agent. The preferred proportion of the hydroxypolycarboxylic acid to the mono-ester is in the range from 0.8 to 1.2 mols to one mol, or more specifically one mol:one mol.

According to the invention several precautions are to be taken in preparing the antispattering esters from fatty acid mono-esters and a hydroxypolycarboxylic acid. The said mono-esters used as a starting material should be freed of unreacted triol or tetrol, since the polyalcohol is quick to react with the hydroxypolycarboxylic acid to form an insoluble gum without antispattering properties; it is preferred to allow no free glycerol or at most 0.3% in the partial fatty acid ester. Further, prolonged heating at the reaction temperature should be omitted; in case appreciably less than 1 mol of hydroxypolycarboxylic acid per 1 mol mono-ester is used a second carboxyl group may esterify causing loss of antispattering activity; but even when there is no excess of fatty acid mono-ester prolonged heating, or heating too high even for a short while, say at 150° C., especially under reduced pressure leads to a loss of antispattering effect. This loss is especially pronounced the more free hydroxyl and/or carboxyl groups the active esters contain. For instance when reacting 1 mol of glycerol-monostearate (in the form of a technical mixture of glycerides containing 70% mono-ester) with 1 mol of citric acid at 130° C. under a pressure of 30 mm., a current of nitrogen being directed through the liquid, the following figures were obtained:

| | after 1 hour | 10 hours |
| --- | --- | --- |
| mol monostearin having reacted | 0.75 | 1.0 |
| mol citric acid having reacted | 0.82 | 1.0 |
| mol water formed | 0.9 | 1.95 |
| acid value | 138 | 37 |
| spattering loss of margarine containing: 0.12% of the ester, 0.04% soya lecithin, 0.1% monostearin } 10 mg | 1,000 mg | |

Though it has not been elucidated exactly what further reactions may occur on further or higher heating it is clear that in order to prevent loss of activity heating should be discontinued after the time allowed for the primary esterification has elapsed.

The corresponding malic acid ester stands up better to prolonged heating at 130° C. for instance, if no reduced pressure is applied.

The preferred conditions of esterifying fatty acid mono-esters with polycarboxylic acids are to heat to about 130° C. during 1-2 hours with stirring, under reduced pressure and/or while bubbling an inert gas through the mixture, cooling the mixture after the time allowed for the reaction has elapsed.

It is of interest to note that an ester obtained from 1 mol monostearin and 1 mol citric acid, the one just described, that had lost antispattering activity by too long heating may regain its activity, or part of it, during several weeks storage of the margarine containing the ester. It is assumed that anhydrization or other reaction involving water being set free, that had occurred during its preparation due to too long heating, may be reversed on storage in the presence of the aqueous margarine phase at a lower temperature.

Monoglycerides are very useful as a component to be esterified in order to obtain the antispattering mixed esters of the invention. Though the influence of the length of the chain of the fatty acid radical or radicals and its degree of unsaturation is not very pronounced, preference is given to monoglycerides derived from stearic or oleic acid, and to the fatty acid mixtures available in the industry of edible fats. The hydroxycarboxylic esters derived from monostearin are solids, those from monoolein are highly viscous liquids.

The name monoglycerides is here applied to the technical grades often containing 35-50% mono-, 30-40% di- and 10-20% triglycerides, but also to purified grades that by speical treatments have obtained high concentrations of monoglyceride. The final products obtained from the latter as starting materials for esterification with polycarboxylic acids, acquire higher anti-spattering activities than those obtained from the so-called monoglycerides, containing lower proportions of actual monoglycerides.

On the other hand satisfactory antispattering esters can also be obtained from diglycerides by esterification with hydroxypolycarboxylic acids but they require esterification temperatures over 150° C. A satisfactory ester is for instance obtained from 1 mol glycerol-distearate and 1 mol citric acid by heating 1 hr. at 155° C. But under the temperature circumstances that favour the esterification of diglycerides, monoglycerides are apt to react too far to show good antispattering activity.

Apart from the hydroxypolycarboxylic acids, aconitic acid and especially tricarballylic acid is a good acid to furnish the polycarboxylic acid residue in the antispattering esters of the invention. Of the hydroxypolycarboxylic acids citric acid is preferred as the polycarboxylic component in the antispattering esters.

Instead of hydroxypolycarboxylic acids unsaturated polycarboxylic acids may be used for esterification with partial fatty acid esters in so far as they can be transformed into hydroxypolycarboxylic acids under the conditions of esterification by addition of water to the double bond. Thus maleic acid anhydride on esterification with an equimolecular proportion of monostearin containing 2% water at 130° C. at atmospheric pressure after ½ to 1 hour's heating yielded a mixture with mediocre antispattering properties, but after 2 to 5½ hours' heating the antispattering activity was quite high; after 8 hours' heating the activity decreased. When the process was repeated with anhydrous raw materials, the activity showed a parallel course, but the maximum after 5½ hours was much lower. Good results may also be obtained under reduced pressure when a substantial pressure of water vapour is maintained so as to provide a sufficient concentration of water in the liquid. When maleic acid anhydride was replaced by citraconic acid similar results were obtained.

The said antispattering effect is that on frying or baking in an uncovered pan the water of the margarine escapes in a quiet manner without any small explosions so that little or even no spattering at all occurs. Spattering losses were measured by weighing a sheet of paper that is held in such a position as to catch all spatters leaving the pan where 80 grams of the margarine to be tested is heated under standardised conditions over an open burner. Similar tests have been described elsewhere.

In the case of certain of the defined antispattering esters, the margarines according to the invention, which for the rest may be manufactured in any customary manner, show other desirable properties on frying, that is to say if the aqueous phase of the margarine contains the ingredients that can form a brown sediment on frying. The said esters favour the formation of a finely divided loose sediment and prevent the separation of large, dark particles or skins that tend to stick to the pan; further it is desirable that part of the surface of the molten margarine is covered by a stable fine foam, which is caused by several of the said esters.

Accordingly, with several of the defined esters, the appearance of the margarine fat after frying is of a clear yellow upper layer and finely divided browned particles underneath. Usually the citric acid esters used according to antispattering also give satisfactory effects as regards browning and foam.

It is a great advantage that according to the invention antispattering esters can be selected which are certain to involve no health hazards.

According to the invention the antispattering esters may be added to the raw materials used in manufacturing margarine, for instance they may be added to the oils or fats while cooling after deodorizing preferably when the temperature is no longer over 100° C.; or the said esters may be incorporated at any stage of margarine manufacturing where good distribution can be obtained. It is also possible to incorporate substances which are transformed in the active esters after the margarine has been manufactured.

The proportion of esters to be used in margarine varies with their composition, especially if the antispattering esters defined in this specification are used in the form of mixtures with other similar esters of far less or no antispattering activity or with unreacted starting materials. For instance, if the product obtained by esterifying technical monostearin containing 35% pure monoglyceride with acylated or non-acylated hydroxypolycarboxylic acid is used, addition of 0.2% to 0.3% will be sufficient; but if the product obtained from a monoglyceride of 90% purity is used 0.05% or less, may be enough.

If the esters defined in this specification are used together with phosphatides, percentages around 0.1% are often sufficient, but 0.01 to 0.05% may be enough since a pronounced synergistic effect with reference to the prevention or reduction of spattering loss on frying is obtained by adding, according to the invention, the mixed esters defined in this specification, and a proportion of the same order of a phosphatide of vegetable, animal or synthetic origin. The phosphatide may be purified or the so-called lecithin separated from vegetable oils, for instance soya lecithin, containing roughly 60% phosphatides and 30–40% vegetable oil, may be used. In the examples included in this specification lecithin of roughly that composition has been used and all percentages of phosphatides in this specification relate to phosphatides of about 60% purity.

The synergistic effect of the combined presence of the antispattering esters defined in this specification and of phosphatides is shown by the figures of the following tables.

TABLE II

*Series with margarine composition A*

| Mixed Ester from equimolecular proportions of— | Percentage added of— | | | Spattering loss, mg. |
|---|---|---|---|---|
| | Ester | Soya lecithin | Monostearin | |
| (no addition) | | | | 4,250 |
| | | 0.04 | 0.1 | 1,700 |
| | | 0.12 | 0.1 | 400 |
| citric acid and 50% pure monostearin | 0.12 | | 0.1 | 250 |
| Do | 0.12 | 0.04 | 0.1 | 0 |
| Do | 0.04 | 0.04 | 0.1 | 0 |

Similar figures have been obtained with the corresponding ester from malic acid.

TABLE III

*Series with margine composition B*

| Mixed Ester from equimolecular proportions of— | Percentage added of— | | Spattering loss, mg. |
|---|---|---|---|
| | Ester | Soya-lecithin | |
| (no addition) | | | 10,000 |
| | | 0.04 | 2,500 |
| | | 0.12 | 475 |
| | | 0.3 | 200 |
| Malic acid and (90% pure) monostearin | 0.12 | | 600 |
| Do | 0.24 | | 0 |
| Do | 0.12 | 0.04 | 0 |

The figures show that spattering may be completely suppressed with the use of exceedingly low percentages of phosphatides in the presence of the mixed esters specified according to the present invention.

There is an optimal proportion of the mixed esters and the phosphatides, but it is evident that this proportion varies with the composition of the esters added. In general it may be said, that the proportion of phosphatide should be equal to or less than the proportion of the mixed ester, say about 30%.

According to this aspect of the invention a composition of matter comprising a mixed ester as defined in this specification and a similar or lesser proportion of a phosphatide, both of edible grade, is useful as an antispattering composition. It may serve not only as an additive to margarine but also to other fats used for frying under conditions where water evaporates and may give rise to spattering or excessive foaming. The composition may contain other edible components of a fatty or oily nature like monoglycerides, fat or oil.

EXAMPLES

I. 100 g. glycerol-monooleate (about 50% pure, less than 0.1% free glycerol) and 15 g. citric acid were heated to 120° C. under stirring until the mixture had become quite homogeneous (duration about 1 hour). This mixture does not as yet show antispattering properties. The esters were kept a further 2 to 3 hours at 130° C. under stirring while a current of nitrogen was directed through the liquid. After incorporating 0.12% of the ester in margarine together with 0.1% monostearin and 0.04% soyalecithin, the margarine on frying spattered very little and formed a finely divided brown sediment, whereas the foam was also satisfactory.

II. 100 g. glycerol-monostearate (57% pure, less than 0.1% free glycerol) and 30 g. diacetyltartaric acid anhydride were stirred at 100–110° C. until a solution was obtained. After 10 minutes the content of monoglycerides in the reaction mixture had decreased to 19%, and the acid value amounted to 87. At this stage the reaction mixture shows only a mediocre antispattering effect. After 2 hours' further heating at 130° C. the acid value had decreased to 76, the monoglyceride content to 10%. After incorporating 0.12% of the final product in margarine together with 0.1% of the said glycerol-monostearate and 0.04% lecithin the margarine showed similar superior frying properties like in Example I.

III. 100 g. glycerol-monolaurate (about 50% purity) and 30 g. acetylcitric acid anhydride were heated to 120° C. with stirring until the mixture had become homogeneous. After 2 hours' further heating to 130° C. while directing a current of nitrogen through the liquid a product was obtained with very good antispattering effect. The percentage of monoglycerides at this stage was 17 and the acid value 40. After adding 0.12% of this ester to margarine together with 0.1% monostearin and 0.04% lecithin the margarine on frying spattered exceedingly little and a satisfactory sediment formed.

IV. 100 g. glycerol-monostearate (52% monoglycerides, 0.2% free glycerol) and 20 g. citric acid were esterified as described in Example I. After 3 hours' heating at 130° C. the monoglyceride content had decreased to 29%. This product of which 0.12% was added to margarine together with 0.1% monostearin and 0.04% lecithin, causes margarine to spatter very little on frying and to form a good brown sediment.

V. 100 g. pentaerythritol-distearate and 48 g. citric acid were heated to 120° C. under stirring while a current of nitrogen was directed over the liquid until the citric acid had practically completely dissolved. After one hour's further heating at 130° C. a product was obtained with an acid value of 130. After adding 0.12% of that product to margarine, together with 0.1% monostearin and 0.04% lecithin the frying properties as regards antispattering effect, sediment and foam were quite satisfactory.

VI. 100 g. sorbitan-monooleate and 25 g. citric acid were heated to 120° C. with stirring while directing nitrogen through the liquid until the mixture was practically homogeneous. After heating at 130° C. a further 2 hours the acid value was 64. After incorporating 0.12% of the product in margarine, together with 0.1% monostearin and 0.04% lecithin an outstanding effect on frying was noticed, as regards lack of spattering and character of the sediment, whereas the manner of foaming also was good.

VII. Following the directions of U.S. Patent 2,192,907, Harris, Example B, an ester was prepared from 3 mol glycerol and 1 mol citric acid by heating during 6 hours to 140°–155° C., which ester still contained unesterified carboxyl groups. The reaction product was treated in pyridine solution in the cold with 1 mol stearoylchloride. After isolating the ester as indicated in the cited patent by extracting with petrol ether the ester had an acid value of 65. For an ester having one free carboxyl group of citric acid an acid value of 75 is calculated. Accordingly the ester does not substantially consist of the completely esterified citric acid of which the formula is given in the cited Example B of the said patent, but of citric acid with one carboxyl group esterified with a monostearin residue and a second carboxyl group esterified with a glyceryl residue, whereas the remaining carboxyl group is unesterified.

Margarine in which 0.12% of this product together with 0.1% monostearin and 0.04% lecithin had been incorporated showed a very low spattering loss and formed a very good sediment.

VIII. 100 g. purified glycerol-distearate (80% glycerol-distearate, 10% glycerol-monostearate 10% tristearate) and 34.6 g. diacetyltartaric acid anhydride were stirred under nitrogen and heated to 170° C.; the mixture became homogeneous. After 2 hours at 170° C. the acid value was 69, the hydroxyl value 24. After incorporating 0.12% of the product in a margarine, together with 0.1% monostearin and 0.04% lecithin, the margarine on frying showed a very low spattering loss and an acceptable brown sediment.

IX. 354 g. commercial glycerol-monooleate (47% glycerol-monooleate) and 67 g. malic acid were stirred under nitrogen and heated to 130° C., until the mixture had become homogeneous. A reduced pressure of 40 mm. was applied and the heating at 130° C. continued for 2 hours. To this completely dry product were added 205 g. of acetic acid anhydride and the mixture heated at 120° C. for one hour, after which the acetic acid and excess acetic acid anhydride were distilled off at reduced pressure. The product, the malic acid ester of glycerol monooleate monoacetate, showed a hydroxyl value of 5 and after incorporating 0.12% in margarine together with 0.1% monostearin and 0.04% lecithin, the margarine on frying showed no spattering loss and a good sediment.

X. A mixture of 60 g. of aconitic acid and 71 g. of acetic acid anhydride were heated for 2 hours at 90–100° C. after which the acetic acid and remaining acetic acid anhydride were distilled off under reduced pressure.

The residue, aconitic acid anhydride was mixed with 124 g. of pure glycerol-monostearate and, with stirring in an atmosphere of nitrogen, heated to 130° C. The mixture at this moment was almost homogeneous, but on further heating a sticky sediment separated. It is evident that only a part of the aconitic acid anhydride had reacted with the glycerol-monostearate to produce the desired esters.

Nevertheless, after incorporating 0.24% of material from the upper layer in a margarine, together with 0.1% monostearin and 0.04% soyalecithin, the margarine on frying showed a fairly low spattering loss.

What we claim is:

1. A method for making margarine antispattering comprising adding to said margarine a mixed ester of an aliphatic polyalcohol, a fatty acid residue and an aliphatic polycarboxylic acid of the schematical formula

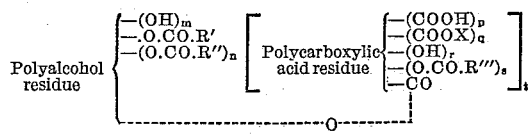

wherein

X = one molecule of a polyalcohol less one OH.
R.CO. = fatty acid residue with 8–24 C-atoms, R″.CO. and R‴.CO.=fatty acid residue with 1–24 C-atoms, The letters $m, n, p, q, r, s$ and $t$ represent the following integers: $t=1$ to 2; $q=0$ to 1; $s=0$ to 2; $q+r+s=0$ to 3; $t+s\leq 3$; $p=1$ to 2; $r=0$ to 2; $p+q=1$ to 2; $p+r+s=2$ to 3; $n=0$ to 1; $m+n+t=2$ to 3, by heating a mixture of said compounds to a temperature between about 110° and about 170° C. during a time between about 10 hours and about 15 minutes the shorter time corresponding to the higher temperature, until said mixed ester is formed, and thereafter discontinuing heating to prevent polymerization and condensation of said mixed ester.

2. Process according to claim 1 where $t=1$.

3. Process according to claim 1 where a carboxyl group of the said polycarboxylic acid residue is esterified with a hydroxyl group of polyalcohol having at least two free hydroxyl groups.

4. Process according to claim 1 where the said polycarboxylic acid is tricarballylic acid.

5. Process according to claim 1 where the said polycarboxylic acid is tartaric acid.

6. Process according to claim 1 where the said polycarboxylic acid is malic acid.

7. Process according to claim 1 where the said polycarboxylic acid is citric acid.

8. Process according to claim 1 comprising the addition to the margarine of the reaction mixture obtained by heating one mol of mono-esters of triols and tetrols with a fatty acid of 8 to 24 carbon atoms with 0.5 to 2 mols of an unsaturated polycarboxylic acid and anhydrides thereof, to temperatures between 110° and 150° C. during 10 to 1 hour, the presence of dissolved water being maintained in the reaction mixture, effecting addition of water to the double bond of the polycarboxylic acid to form hydroxy acid and effecting also esterification.

9. Process according to claim 1 comprising the addition to the margarine of the reaction mixture obtained by heating monoesters of triols and tetrols with aliphatic fatty acids containing 8 to 20 carbon atoms, said monoester containing at most a low proportion of free polyalcohol, with an aliphatic hydroxypolycarboxylic acid to a temperature between 110° and 150° C. during 10 hours to about 15 minutes, the time allowed being shorter the higher the temperature, cooling the resulting mixture after the reaction using as a maximum about 1 mol hydroxypolycarboxylic acid per mol monoester.

10. Process according to claim 1 where the proportion of the said mixed ester or esters containing a polyalcohol residue esterified with a polycarboxylic acid residue amounts to between about 0.01 and about 0.3%.

11. Process according to claim 1 where also a proportion of a phosphatide is incorporated in the margarine.

12. Process according to claim 11 wherein the proportion of phosphatide is not greater than the proportion of the said mixed ester.

13. Process of manufacturing a mixed partial ester by heating monoesters of triols and tetrols with aliphatic fatty acids containing 8 to 24 carbon atoms, said monoester containing at most a low proportion of free polyalcohol, with an aliphatic hydroxypolycarboxylic acid, to a temperature between 110° and 150° C. during 10 hours to about 15 minutes, the time allowed being shorter the higher the temperature, cooling the resulting mixture after the reaction and using a proportion between about 0.8 and about 1.2 mols, preferably about 1 mol of polycarboxylic acid per mol monoester.

14. An antispattering margarine composition containing a mixed ester as defined in claim 1.

15. An antispattering margarine composition comprising margarine and 0.04 to 0.3% of a mixed ester as defined in claim 1 and a phosphatide in an amount not greater than that of said ester.

16. An antispattering margarine composition comprising margarine, a mixed ester as defined in claim 1 and an amount of a phosphatide, not greater than the amount of said ester.

17. Process according to claim 1 wherein the said polycarboxylic acid is aconitic acid.

18. A method for making margarine antispattering comprising the addition to the margarine of the reaction mixture obtained by heating mono-esters of glycerol with aliphatic fatty acids, containing 8 to 24 carbon atoms with citric acid to a temperature between 110° and 150° C. during 10 hours to about 15 minutes, the time allowed being shorter the higher the temperature, cooling the resulting mixture after the reaction using as a maximum about 1 mol hydroxypolycarboxylic acid per mol monoester.

19. A method for making margarine antispattering comprising the addition to the margarine of the reaction mixture obtained by heating mono-esters of glycerol with aliphatic fatty acids, containing 8 to 24 carbon atoms with malic acid to a temperature between 110° and 150° C. during 10 hours to about 15 minutes, the time allowed being shorter the higher the temperature, cooling the resulting mixture after the reaction using as a maximum about 1 mol hydroxypolycarboxylic acid per mol monoester.

20. Process of manufacturing a mixed partial ester by heating monoesters of glycerol with aliphatic fatty acids containing 8 to 24 carbon atoms with citric acid to a temperature between 110° and 150° C. during 10 hours to about 15 minutes, the time allowed being shorter the higher the temperature, cooling the resulting mixture after the reaction and using a proportion between about 0.8 and about 1.2 mols, preferably about 1 mol of polycarboxylic acid per mol monoester.

21. Process of manufacturing a mixed partial ester by heating monoesters of glycerol with aliphatic fatty acids containing 8 to 24 carbon atoms with malic acid to a temperature between 110° and 150° C. during 10 hours to about 15 minutes, the time allowed being shorter the higher the temperature, cooling the resulting mixture after the reaction and using a proportion between about 0.8 and about 1.2 mols, preferably about 1 mol of polycarboxylic acid per mol monoester.

22. Process of manufacturing a mixed partial ester by heating mono-esters of triols and tetrols with aliphatic fatty acids containing 8–24 carbon atoms, said monoester containing at most a low proportion of free polyalcohol with an aliphatic hydroxypolycarboxylic acid, to a temperature of about 130° C. during 1–2 hours, under reduced pressure while directing a current of inert gas through the reaction mixture, cooling the resulting mixture after the reaction, wherein about 1 mol of hydroxyacid per mol mono-ester is used.

References Cited in the file of this patent

UNITED STATES PATENTS

| | | |
|---|---|---|
| 2,118,308 | Jaeger | May 24, 1938 |
| 2,402,690 | Stanley | June 25, 1946 |
| 2,469,371 | Colbeth | May 10, 1949 |
| 2,509,414 | Barsky | May 30, 1950 |
| 2,552,706 | Hendrik | May 8, 1951 |
| 2,724,649 | Julian et al. | Nov. 22, 1955 |
| 2,813,032 | Hall | Nov. 12, 1957 |

UNITED STATES PATENT OFFICE
CERTIFICATE OF CORRECTION

Patent No. 3,006,772                        October 31, 1961

Gerardus Martinus Maria Houben et al.

It is hereby certified that error appears in the above numbered patent requiring correction and that the said Letters Patent should read as corrected below.

Column 3, line 1, for "or" read -- Far --; column 8, line 75, for "R.CO. read -- R'.CO. --; column 9, line 17, after "of" insert -- a --.

Signed and sealed this 5th day of June 1962.

(SEAL)
Attest:

ERNEST W. SWIDER                              DAVID L. LADD
Attesting Officer                                 Commissioner of Patents